(12) United States Patent
Nanda et al.

(10) Patent No.: US 7,624,222 B2
(45) Date of Patent: Nov. 24, 2009

(54) SOUTH BRIDGE SYSTEM AND METHOD

(75) Inventors: Ashwini K. Nanda, New Delhi (IN); Krishnan Sugavanam, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 11/539,211

(22) Filed: Oct. 6, 2006

(65) Prior Publication Data

US 2008/0086583 A1 Apr. 10, 2008

(51) Int. Cl.
G06F 13/00 (2006.01)
G06F 3/00 (2006.01)
G06F 13/36 (2006.01)

(52) U.S. Cl. .................. 710/316; 710/36; 710/309; 710/311

(58) Field of Classification Search ............ 710/2, 710/36, 37, 40, 300, 107, 113, 305, 306, 710/309, 311, 316, 317; 709/226, 229; 370/360, 370/362, 537
See application file for complete search history.

(56) References Cited

U.S. PATENT DOCUMENTS

| 6,115,551 | A * | 9/2000 | Chao ..................... 710/62 |
| 6,424,655 | B1 * | 7/2002 | Horst ..................... 370/412 |
| 2005/0044284 | A1 * | 2/2005 | Pescatore ............... 710/15 |
| 2005/0086463 | A1 * | 4/2005 | Quach et al. ........... 713/100 |
| 2005/0235067 | A1 * | 10/2005 | Creta et al. ............ 710/5 |
| 2005/0251612 | A1 * | 11/2005 | Creta et al. ........... 710/316 |
| 2006/0106997 | A1 * | 5/2006 | Elliott et al. ........... 711/150 |
| 2007/0005866 | A1 * | 1/2007 | Pike et al. ............. 710/306 |
| 2007/0047584 | A1 * | 3/2007 | Spink et al. ........... 370/474 |
| 2008/0002603 | A1 * | 1/2008 | Hutsell et al. ......... 370/318 |
| 2008/0005346 | A1 * | 1/2008 | Schoinas et al. ...... 709/230 |
| 2008/0005596 | A1 * | 1/2008 | Sistla et al. ........... 713/300 |

OTHER PUBLICATIONS

"The Free On-Line Dictionary of Computing". Entry 'printed circuit board'. Online May 1, 1995. Retrieved from Internet Aug. 13, 2008. <http:/foldoc.org/index.cgi?Printed+Circuit+Board>.*
"The Free On-Line Dictionary of Computing". Entry 'integrated circuit'. Online Mar. 7, 1997. Retrieved from Internet Mar. 20, 2009. <http://foldoc.org/index.cgi?query=integrated+circuit>.*
"The Free On-Line Dictionary of Computing". Entry 'Universal Serial Bus'. Online Jan. 31, 2004. Retrieved from Internet Mar. 20, 2009. <http://foldoc.org/index.cgi?query=Universal+Serial+Bus>.*
"Wikipedia, the free encyclopedia". Entry 'Southbridge (computing)'. Online Sep. 26, 2006. Retrieved from Internet Mar. 23, 2009. <http://en.wikipedia.org/w/index.php?title=Southbridge_(computing)&oldid=77909557>.*

* cited by examiner

*Primary Examiner*—Thomas J Cleary
(74) *Attorney, Agent, or Firm*—Michael LeStrange; Greenblum & Bernstein PLC

(57) ABSTRACT

A system including a south bridge, a first processor connected to the south bridge, and a second processor connected to the south bridge. The system further includes at least one device connected to the south bridge, and a resource manager coupled to the south bridge that allocates use of the at least one device between the first processor and the second processor.

23 Claims, 4 Drawing Sheets

SOUTH BRIDGE SYSTEM AND METHOD

FIELD OF THE INVENTION

The invention generally relates to a system and method for managing computing components, and more particularly to a system and method for managing communication between processors and resources using a south bridge.

BACKGROUND OF THE INVENTION

Blade servers with multiple processors (e.g., central processing units) per blade are becoming increasingly popular as servers for commercial, scientific, and personal computing applications. The small form factor (e.g., 1 U) of such blade servers combined with the low power dissipation and high performance make these blade servers attractive for almost any computing application. Typically, a blade includes two processors and associated memory (e.g., DDR, RAMBUS, etc.). The memory control functions that were historically performed by a north bridge chip have been absorbed into the processors, eliminating the need for a separate north bridge chip and a shared system bus. Moreover, because the shared system bus has been replaced by faster point-to-point connections, the arbitration schemes that were based upon the shared system bus also have been eliminated.

Each processor typically still has a dedicated south bridge chip for handling communication between the processor and various input/output resources, such as, for example, Ethernet, EPROM, USB, PCI Express, RAID, SCSI, SATA, Firewire, etc. For example, a first processor is connected by point-to-point connections to a first south bridge, and a second processor is connected by point-to-point connections to a second south bridge. Each respective processor has access to the various resources associated with its dedicated south bridge chip, but does not have access to the resources of the other south bridge chip that is dedicated to the other processor.

Driven at least in part by a desire for general use capability, south bridge chip designers have integrated more and more features (i.e., capability of handling different resources) into current south bridge chips. A benefit of such a design paradigm is that a typical south bridge chip is robust in that it supports most, if not all, of the features required by different processing environments. A drawback of the design paradigm, however, is that the south bridge chip is oversized for any particular application because it contains more features than required by a single processor in a particular processing environment.

Component size and power dissipation are ever-present design considerations in computing architecture. As discussed above, a typical south bridge chip is oversized because it is designed to handle more features than are routinely required by a single processor in a particular processing environment. More specifically, the typical south bridge chip is physically oversized in that it occupies a greater amount of board space than would be used by a chip designed for a specific processor application. Additionally, the typical south bridge chip is oversized in its power dissipation (and, therefore, heat generation) due to the existence of so many features (even when some of the features are unused). The negative effects of increased physical size and power dissipation are compounded on a dual processor blade where each processor has a dedicated south bridge chip. With area and power being a premium in these blades, efficiently designing dual processor blades with plural dedicated south bridge chips is increasingly difficult.

SUMMARY OF THE INVENTION

In a first aspect of the invention, a system comprises a south bridge, a first host connected by a first point-to-point connection to the south bridge, and a second host connected by a second point-to-point connection to the south bridge. The system further comprises at least one resource connected to the south bridge. The south bridge manages a sharing of the at least one resource by the first host and the second host.

In a second aspect of the invention, a south bridge chip comprises a first host interface, a second host interface, and at least one device controller. The chip also comprises a resource manager that allocates use of the at least one device controller between the first host interface and the second host interface.

In a third aspect of the invention, there is a method of arbitrating between a plurality of hosts connected in point-to-point arrangements to a south bridge. The method comprises receiving at the south bridge a request to use a resource from one of the plurality of hosts. The method also comprises determining availability of the requested resource. The method additionally comprises establishing communication between the one of the plurality of hosts and the resource when the resource is available for use.

In a fourth aspect of the invention, a computer system comprises a south bridge, a first processor connected to the south bridge, and a second processor connected to the south bridge. The computer system further comprises at least one device connected to the south bridge, and a resource manager coupled to the south bridge that allocates use of the at least one device between the first processor and the second processor.

DETAILED DESCRIPTION OF EMBODIMENTS OF THE INVENTION

The invention is directed to system and method for communication management in computing systems. Implementations of the invention provide a resource manager that allows a single south bridge to arbitrate resources between plural processors. In this manner, the conventional one-to-one correspondence of processors to south bridges may be eliminated, thereby saving board space, power dissipation, and cost.

Figure 1:
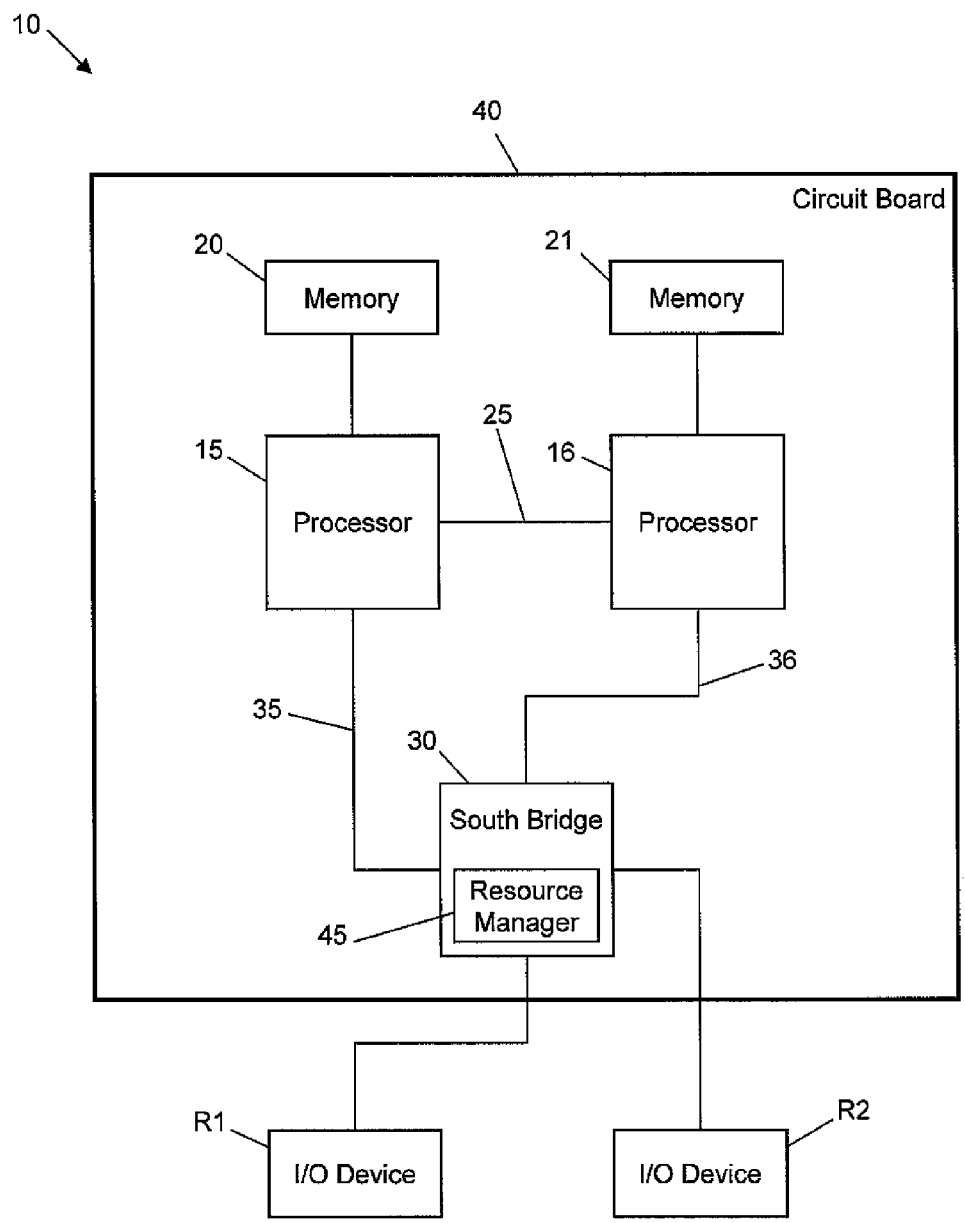
FIG. 1 shows a system for communication management in computing systems according to aspects of the invention.

FIG. 1 shows a system 10 according to aspects of the invention. The system 10 comprises a first processor 15 and a second processor 16. In embodiments, the first and second processors 15, 16 may be central processing unit semiconductor-based chips, as understood by those of skill in the art. The first processor 15 is connected to a first memory 20, and the second processor 16 is connected to a second memory 21. The first and second memories 20, 21 may be any suitable memory structure such as, for example, DRAM chip(s). The first and second memories 20, 21 may each comprise plural discrete memory chips that are connected to the respective processors. The first and second memories 20, 21 may be connected to the first and second processors 15, 16 in any suitable manner, including point-to-point connections, as known to those of skill in the art. In embodiments, the first and second processors 15, 16 are connected by a point-to-point connection 25 that communicates shared memory traffic between the processors, as is known in the art.

The system 10 further comprises a south bridge 30. In embodiments, the south bridge 30 comprises a semiconductor-based chip. The south bridge 30 is connected to the first processor 15 by a first point-to-point connection 35. The south bridge is also connected to the second processor 16 by a second point-to-point connection 36. In this manner, the first and second processors 15, 16 may communicate with the south bridge 30 in known fashion.

In embodiments, the first and second processors 15, 16 and the south bridge 30 are all connected to a circuit board 40, such as, for example, a motherboard, blade server, etc. The first and second memories 20, 21 may also be disposed on or in the circuit board 40. For example, the first and second processors 15, 16, the first and second memories 20, 21, and the south bridge 30 may each comprise a respective chip that is connected to the circuit board by pins, as is known in the art. Moreover, the circuit board 40 may be comprised in a larger computing structure, such as, for example, a server rack, personal computer, handheld computer, etc.

Still referring to FIG. 1, the south bridge 30 is connected to at least one resource. Two resources, R1 and R2, are shown in FIG. 1, although any number may be employed. The south bridge 30 is connected to the resources R1, R2 in any known manner, such as, for example, via connections on the circuit board. The resources R1, R2 may comprise various devices that are capable of communicating with a processor. For example, the resources may comprise input/output devices such as Ethernet, EPROM, USB, PCI Express, RAID, SCSI, SATA, Firewire, etc. The south bridge 30 controls the communication between the first and second processors 15, 16 and the respective resources R1, R2, as described herein.

The south bridge 30 comprises a resource manager 45 that functions to arbitrate communication between the first and second processors 15, 16 and the respective resources R1, R2. The resource manager 45 may comprise any combination of hardware (e.g., circuitry, etc.) and logical programming (e.g., instruction set, microprogram, etc.), and may be integrated with or separate from the south bridge 30. In embodiments, the south bridge 30 comprises a chip that integrally comprises the resource manager 45.

In implementations, the resource manager 45 comprises circuitry and logical programming that function to arbitrate communication between respective processors and respective resources. In embodiments, the resource manager 45 is capable of receiving, from either processor, a request to communicate with one of the various resources. The request from the processor may be embodied in any suitable form, such as, for example, data transmission to registers within the resource manager 45. If the resource is available (e.g., not being used by the other processor), the resource manager 45 will establish communication between the requesting processor and the resource, such that data may be transferred between the processor and the resource. The resource manager 45 may establish communication in a known manner, such as, for example, by sending signals to dynamic multiplexers that control the flow of data between the processors and the resources. In this manner, either processor 15, 16 may access any of the resources connected to the south bridge 30, instead of being limited to the resources associated with a dedicated south bridge.

Figure 2:
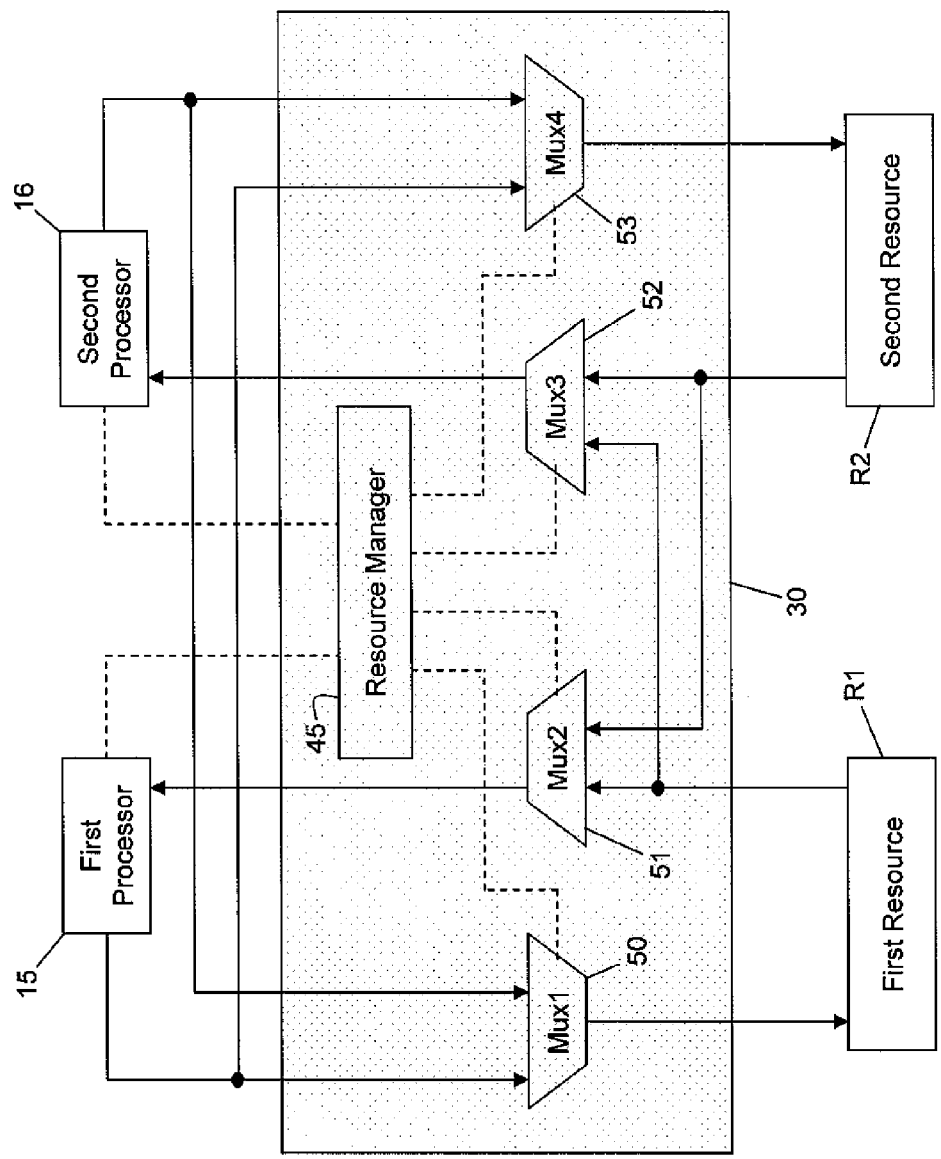
FIG. 2 shows a functional diagram of the system depicted in FIG. 1.

FIG. 2 shows a functional diagram of the system 10 described above. FIG. 2 depicts the first and second processors 15, 16, the south bridge 30, and the resources R1, R2. The south bridge 30 includes the resource manager 45, first multiplexer 50, second multiplexer 51, third multiplexer 52, and fourth multiplexer 53. In embodiments, the multiplexers 50-53 comprise dynamically controllable multiplexers that are connected to and controllable by the resource manager 45. Such dynamically controllable multiplexers are known in the art. In embodiments, the south bridge 30 comprises a chip and the resource manager 45 and multiplexers 50-53 are integrated into the circuitry of the chip.

Still referring to FIG. 2, the arrows represent possible communication between the processors and the resources. Additionally, the dotted lines represent communication between the resource manager 45 and processors multiplexers. Such communication may be accomplished in any suitable manner, such as through the use of registers, as is known in the art. In operation, the first processor 15 may communicate with the resource manager 45 to request use of the first resource R1. The resource manager 45, based on examining outstanding requests to R1, determines whether the first resource R1 is available. If the first resource R1 is available, then the resource manager 45 sends appropriate signals to the appropriate multiplexers (i.e., controls the multiplexers) to establish communication between the first processor 15 and the first resource R1. While the first processor 15 is using (e.g., communicating with) the first resource R1, the resource manager 45 also controls the appropriate multiplexers to prevent the second processor 16 from using (e.g., communicating with) the first resource R1. In this manner, the south bridge 30, via the resource manager 45 and multiplexers 50-53, allocates the resources R1, R2 between the first and second processors 15, 16. Put another way, the south bridge 30, via the resource manager 45 and multiplexers 50-53, arbitrates between the potentially competing processors 15, 16.

The resource manager 45 can control the multiplexers 50-53 to achieve any discrete allocation between the processors 15, 16 and resources R1, R2. For example, the first processor 15 may be put into communication with the second resource R2, while the second processor 16 is put into communication with the first resource R1. Alternatively, the second processor 16 may be put into communication with both the first resource R1 and the second resource R2, while the first processor 15 communicates with neither. In this manner, the single south bridge 30 is used to allocate a plurality of resources between plural processors. Moreover, while the system has been described with respect to two processors and two resources, implementations of the invention may be employed with any number of processors and resources by adjusting the number and connection of the multiplexers accordingly.

Figure 3:
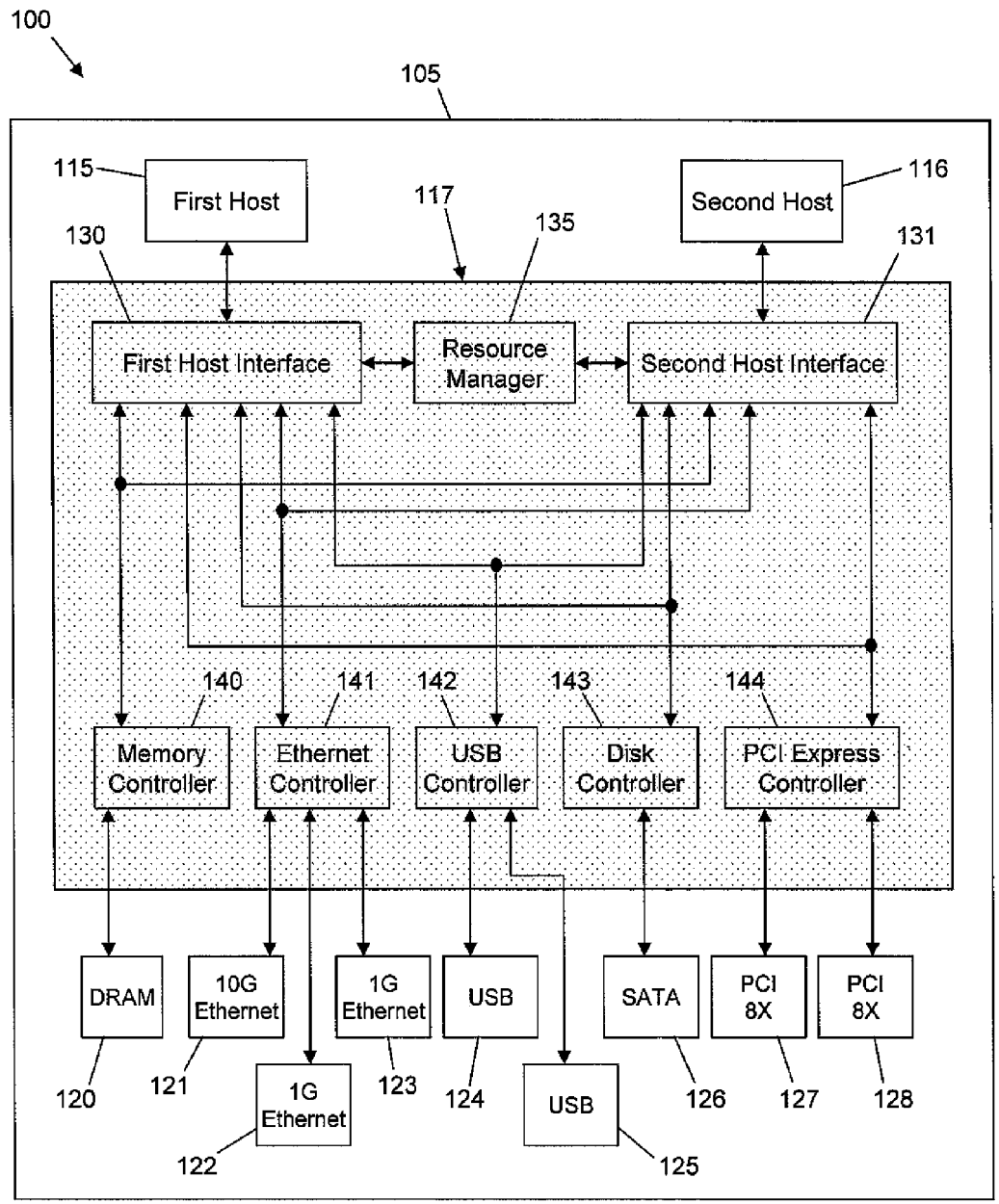
FIG. 3 shows an alternative system according to aspects of the invention.

FIG. 3 shows an alternative system 100 according to aspects of the invention. The system 100 includes a board 105, which may be, for example, a circuit board, mother board, blade server etc. First host 115 and second host 116, which may be similar to the processors 15, 16 described above, are connected to the board 105. The system 100 also includes a south bridge 117, which may be similar to that described above, connected to the board 105. The board 105 also includes connection points for various resources (e.g., input/output devices) including: DRAM 120, 10G Ethernet 121, first 1G Ethernet 122, second 1G Ethernet 123, first USB 124, second USB 125, SATA 126, first PCI Express 127, and second PCI Express 128.

The south bridge 117 includes a first host interface 130 and a second host interface 131 that transmit data to and from the hosts 115, 116. In embodiments, the first host 115, second host 116, and south bridge 117 are respective semiconductor chips that are plugged into the board 105 by pins, as is known in the art. The board 105 provides a point-to-point connection between the first host 115 and the first host interface 130, and between the second host 116 and the second host interface 131.

The south bridge 117 also includes a resource manager 135, which may be similar to that described above. The host interfaces 130, 131 are connected to the resource manager 135 to allow communication between the hosts 115, 116 and the resource manager 135. The host interfaces 130, 131 and resource manager 135, and all connections therebetween, may be integrated into the structure of the south bridge 117. For example, all may be part of a single chip.

Still referring to FIG. 3, the south bridge 117 further includes controllers for the various devices that connect to the connection points 120-128, described above. For example, as shown in FIG. 3, the south bridge 117 includes a memory controller 140 that controls communication between the hosts and a DRAM device. Similarly, the south bridge 117 includes an Ethernet controller 141, a USB controller 142, a disk controller 143, and a PCI Express controller 144. Such controllers are known in the art, and may be integrated into the structure of the south bridge as is known in the art. Although these specific controllers have been shown, it is understood that other controllers and/or other numbers of controllers may be used.

The south bridge 117 also includes switching devices for controlling communication between the host interfaces 115, 116 and the controllers 140-144. For example, the switching devices may comprise controllable multiplexers (not shown) similar to those described above. In embodiments, the multiplexers are connected between the host interfaces 115, 116 and the controllers 140-144. The multiplexers are also connected to the resource manager 135 such that they may be controlled by the resource manager 135 in a manner similar to that already described. The multiplexers, and associated connections, may be integrated into the structure of the south bridge 117.

Similar to the manner described above, the south bridge 117, including the resource manager 135, may allocate the use of various input/output resources to the hosts 115, 116. The system 100 provides the allocation (e.g., arbitration) using a single south bridge, thereby saving board space, power (e.g., heat), and cost by eliminating the need for plural dedicated south bridges.

Method of Use

Figure 4:
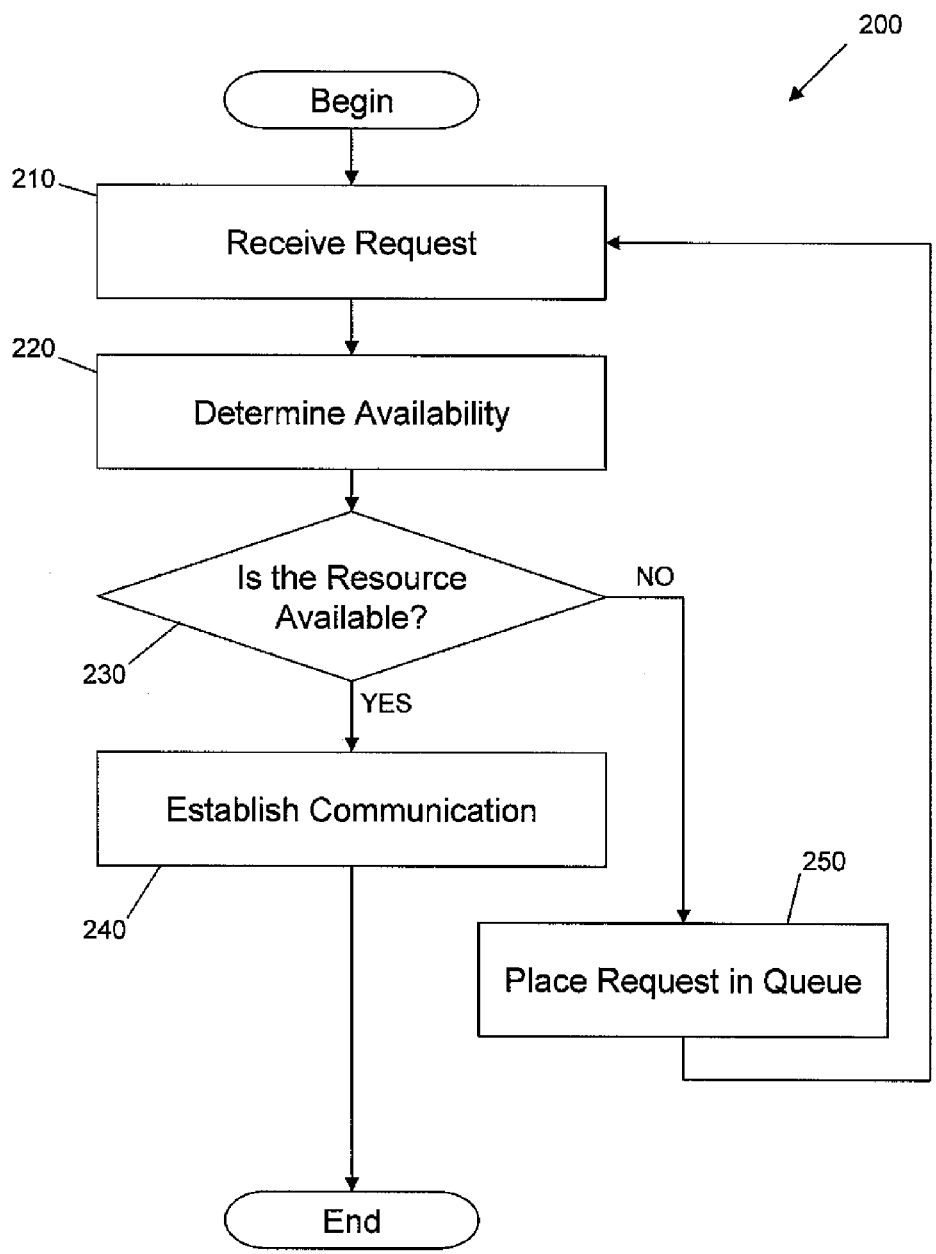
FIG. 4 shows a flow diagram of the method in accordance with aspects of the invention.

FIG. 4 is a flow diagram implementing steps of the invention. FIG. 4 may equally represent a high-level block diagram of the invention. The steps of FIG. 4 may be implemented in internal logic of a computing system, such as, for example, in internal logic of a south bridge chip. Additionally, the invention can take the form of an entirely hardware embodiment, an entirely software embodiment or an embodiment containing both hardware and software elements.

FIG. 4 shows a flow diagram of a method 200 of managing communication between hosts (e.g., processors) and resources (e.g., devices) using a south bridge according to aspects of the invention. At step 210 a request from either host is received by the south bridge. In embodiments, the host comprises a processor and the request is for the processor to use (e.g., communicate with) a resource comprising an input/output device. For example, the processor may send the request to the south bridge, as described above.

At step 220, the resource manager (which is preferably integrated with the south bridge) determines the availability of the requested resource. In implementations, the resource manager makes this determination by examining if the resource is already in use by another processor, as described previously. Moreover, it is contemplated that the resource manager can be separate from the south bridge. However, in such an embodiment, it is understood that the output of the resource manager connects to the south bridge in such a manner as to allocate the resources of the south bridge.

At step 230, if the resource is available, then communication is established (e.g., use is allocated) at step 240. For example, if the processor requested the use of the first USB device, and that device is available, then the resource manager controls switching devices (e.g., multiplexers) in the south bridge to establish communication between the processor and the USB device.

At step 230, if the resource is not available, then the processor cannot immediately be placed in communication with the requested resource. For example, the resource may be in use with a different processor. In this case, at step 250, the request is placed in a queue. The requests in the queue are resubmitted to the resource manager in order, such that the next request in the queue is received at step 210.

The invention as described provides a system and method that employ a single south bridge having a resource manager to allocate resources between plural processors. The invention may be implemented for any suitable type of computing device including, for example, blade servers, personal computers, workstations, etc.

While the invention has been described in terms of embodiments, those skilled in the art will recognize that the invention can be practiced with modifications and in the spirit and scope of the appended claims.

What is claimed:

1. A system, comprising:
a south bridge chip comprising at least one multiplexer;
a first host connected by a first point-to-point connection to the south bridge chip;
a second host connected by a second point-to-point connection to the south bridge chip; and
at least one resource connected to the south bridge chip,
wherein the south bridge chip manages a sharing of the at least one resource by the first host and the second host by determining availability of the at least one resource in response to receiving a request to use the at least one resource from at least one of the first host and the second host.

2. The system of claim 1, wherein:
the first host comprises a first processor;
the second host comprises a second processor, and
the at least one resource comprises an input/output device.

3. The system of claim 1, wherein:
the at least one resource comprises a first resource and a second resource,
the at least one multiplexer comprises a first multiplexer, a second multiplexer, a third multiplexer, and a fourth multiplexer,
the first host is operatively connected to the first multiplexer, the second multiplexer, and the fourth multiplexer,
the second host is operatively connected to the first multiplexer, the third multiplexer, and the fourth multiplexer, the first resource is operatively connected to the first multiplexer, the second multiplexer, and the third multiplexer, and the second resource is operatively connected to the second multiplexer, the third multiplexer, and the fourth multiplexer.

4. The system of claim 1, wherein the at least one multiplexer comprises a datapath multiplexer.

5. A south bridge chip, comprising:
a first host interface;
a second host interface;
at least one device controller;
a resource manager that allocates use of the at least one device controller between the first host interface and the second host interface by determining availability of the at least one device controller in response to receiving a request to use the at least one device controller from at least one of the first host interface and the second host interface; and
pins for connecting the south bridge chip to a circuit board.

6. The south bridge chip of claim 5, wherein:
the at least one device controller comprises a plurality of device controllers, and
the resource manager allocates the use of any of the plurality of device controllers between the first host interface and the second host interface.

7. The south bridge chip of claim 5, further comprising multiplexers that control communication between the at least one device controller and at least one of the first host interface and the second host interface.

8. The south bridge chip of claim 7, wherein the resource manager controls the multiplexers.

9. The south bridge chip of claim 7, wherein the multiplexers comprise datapath multiplexers.

10. The south bridge chip of claim 5, wherein the at least one device controller comprises a plurality of device controllers, including:
a memory controller,
an Ethernet controller,
a USB controller,
a disk controller, and
a PCI Express controller.

11. A method of arbitrating between a plurality of hosts connected in point-to-point arrangements to a south bridge chip, comprising:
receiving at the south bridge chip a request to use a resource from one of the plurality of hosts;
determining availability of the resource; and
when available, establishing communication between the one of the plurality of hosts and the resource using at least one multiplexer,
wherein the receiving the request and the determining the availability are performed by a resource manager of the south bridge chip.

12. The method of claim 11, wherein the establishing communication is controlled by a resource manager of the south bridge chip.

13. The method of claim 12, wherein the establishing communication comprises:
controlling communication from the plurality of hosts to the resource by controlling a first set of multiplexers; and
controlling communication from the resource to the plurality of hosts by controlling a second set of multiplexers, different from the first set of multiplexers.

14. A computer system, comprising:
a south bridge chip comprising at least one multiplexer;
a first processor connected to the south bridge chip;
a second processor connected to the south bridge chip;
at least one device connected to the south bridge chip; and
a resource manager coupled to the south bridge chip that allocates use of the at least one device between the first processor and the second processor by determining availability of the at least one device in response to receiving a request to use the at least one device from at least one of the first processor and the second processor.

15. The computer system of claim 14, wherein the south bridge chip comprises the resource manager.

16. The computer system of claim 14, wherein the first processor comprises a first chip, the second processor comprises a second chip, and the south bridge chip comprises a third chip.

17. The computer system of claim 16, further comprising a circuit board,
wherein the first chip, the second chip, and the third chip are connected to the circuit board by pins.

18. The computer system of claim 17, wherein the circuit board provides a first point-to-point connection between the first processor and the south bridge chip and a second point-to-point connection between the second processor and the south bridge chip.

19. The computer system of claim 17, wherein the circuit board comprises a blade server.

20. The computer system of claim 17, wherein the at least one device comprises an input/output device that is connected to the circuit board.

21. The computer system of claim 14, wherein the south bridge chip comprises:
a first set of multiplexers controllable by the resource manager for controlling communication from the first processor and the second processor to the at least one device; and
a second set of multiplexers, different from the first set of multiplexers, controllable by the resource manager for controlling communication from the at least one device to the first processor and the second processor.

22. The computer system of claim 14, wherein:
the at least one device comprises a plurality of input/output devices, and
the first processor and the second processor each has access to any of the plurality of input/output devices based upon the allocation by the resource manager.

23. The computer system of claim 14, wherein the at least one multiplexer comprises a datapath multiplexer.

* * * * *